United States Patent [19]

Scranton et al.

[11] Patent Number: 4,648,087
[45] Date of Patent: Mar. 3, 1987

[54] CAPACITIVE SENSING EMPLOYING THIN FILM INDUCTORS

[75] Inventors: Robert A. Scranton; David A. Thompson, both of South Salem, N.Y.

[73] Assignee: International Business Machines Corporation, Armonk, N.Y.

[21] Appl. No.: 625,756

[22] Filed: Jun. 28, 1984

[51] Int. Cl.⁴ .................... G11B 5/31; G11B 13/00
[52] U.S. Cl. .................... 360/103; 369/14; 369/126; 360/110
[58] Field of Search ........... 360/75, 77, 78, 135, 360/103, 110, 102; 369/13, 14, 43, 126

[56] References Cited

U.S. PATENT DOCUMENTS

| | | | |
|---|---|---|---|
| 3,783,196 | 1/1974 | Stanley | 369/126 |
| 3,842,194 | 10/1974 | Clemens | 369/126 |
| 4,080,625 | 3/1978 | Kawamoto et al. | 369/126 |
| 4,152,641 | 5/1979 | Hughes et al. | 369/126 |
| 4,459,691 | 7/1984 | Yamada | 369/126 |
| 4,528,655 | 7/1985 | Tamura et al. | 369/126 |
| 4,558,422 | 12/1985 | Yamada | 369/126 |

FOREIGN PATENT DOCUMENTS

| | | | |
|---|---|---|---|
| 56-134333 | 10/1981 | Japan | 369/126 |
| 58-118017 | 7/1983 | Japan | 360/110 |
| 2096384 | 10/1982 | United Kingdom | 369/14 |

OTHER PUBLICATIONS

Scientific American, "Disk Storage Technology", White, Aug. 1980, pp. 138–148.
IBM TDB, vol. 23, No. 3, "Optically Read and Servoed Direct—Access Storage Device", Workman, 8/80, pp. 1201–1203.
IBM Disk Storage Technology, "IBM 3370 Film Head Design and Fabrication", Jones, Jr., pp. 6 et seq.
IBM TDB, vol. 21, No. 6, "Capacitive Servoing on Topographic Variations", Potter, 11/78, p. 2506.
IBM TDB, vol. 21, No. 10, "Floppy Disc Embossing for Servo Applications", Acosta et al., 3/79, pp. 4259–4260.
IERE Conference Proceeding, No. 423, "Embossed Servo Techniques for Floppy Discs", Thompson et al., 1979, pp. 321–327.

Primary Examiner—Raymond F. Cardillo
Assistant Examiner—Steven R. Garland
Attorney, Agent, or Firm—Pollock, Vande Sande & Priddy

[57] ABSTRACT

A capacitive variation sensor includes one or more elements providing inductive reactance in the form of thin film coils. This enables a capacitive variation sensor to be integrated on a substrate along with a thin film magnetic read/write head. One element of the capacitive variation sensor is a sensing electrode, and in some embodiments of the invention a dedicated sense electrode can be eliminated by employing the pole tips of the thin film magnetic read/write head as the sense electrode.

11 Claims, 11 Drawing Figures

CAPACITIVE SENSING EMPLOYING THIN FILM INDUCTORS

DESCRIPTION

1. Technical Field

The invention relates to apparatus for detecting small capacitance variations which is particularly useful in position sensing, non-destructive testing, monitoring mechanical vibrations, for use with silicon micromechanical structures and for capacitive data sensing in audio, digital and video disks, tapes or the like.

2. Background Art

The ability to sense minute capacitive variations has been applied in a variety of applications; see for example Stanley U.S. Pat. No. 3,783,196; Kawamoto et al U.S. Pat. No. 4,080,625 and Kawamoto et al U.S. Pat. No. 4,152,641. These patents describe the use of minute capacitive variation detectors used in video disks and the play-back apparatus for video disks. The use of capacitive sensing is not at all limited to video disk applications, see for example "Embossed Servo Techniques for Floppy Disks" by Thompson et al appearing in the *IERE Conference Proceedings* (London), No. 43, pages 321 et seq (1979). The Thompson et al paper reports on an assessment of the feasibility of using capacitive sensing of embossed patterns in a track following servo for a floppy disk system.

Three aspects of a system for obtaining a position signal (radial or circumferential), used for example with a video disk and/or a magnetic floppy disk, are (1) some method of placing capacitive contrast information on the rotating member, (2) imprinting patterns or codes to put position information into the contrast mechanism, and (3) using the patterns or codes to obtain an actual position signal. There are many techniques and teachings with respect to the first two requirements, see, in connection with (1) the Krongelb et al application Ser. No. 494,743, filed May 16, 1983, abandoned, assigned to the assignee of this application, and in respect of (2) see "An Optical Servo Arrangement for Magnetic Disk Recording" by Workman, IBM TDB, Vol. 23, No. 3, pages 1200 et seq (August 1980).

The present invention addresses requirement (3), e.g. obtaining a useful position signal based on capacitive variations. The prior art illustrates capacitive sensing circuits using inductors. In particular, the Kawamoto et al patents cited above illustrate very sensitive capacitive sensing schemes utilizing radio frequency carriers and resonant strip-lines or resonant microwave cavities. Capacitance variations produce amplitude modulations in the output which are then detected to provide a measure of the capacitance variations. For example, the RCA video disk player uses a strip-line at 915 MHz to detect capacitance variations of $10^{-16}$ F, the same order of magnitude signals that would have to be sensed in a magnetic recording application. It is a particular disadvantage of these prior art techniques that the strip-lines and/or microwave resonant cavities are extremely long, several inches. For example, in U.S. Pat. No. 4,080,625, the transmission line is formed as a printed circuit conductor wherein the length must be sufficient to be near resonant with the associated capacitance at the appropriate frequencies.

U.S. Pat. No. 3,783,196 is similar to the above-mentioned patent in that it shows the use of an inductor 145, but suggests no implementation for that particular element. U.S. Pat. No. 4,152,641 employs a transmission line 27; as shown in FIG. 1, the use of a printed circuit form of transmission line 27 is suggested.

In "Disks-Storage Technology" by White, appearing in *Scientific American*, August 1980, pages 138 et seq, typical magnetic read/write storage systems are described. One such system employing a thin film head is illustrated on pages 142 and 143. These illustrations are described at page 145 wherein the IBM Model 3370 disk memory is mentioned. In this connection, see also "IBM Disk Storage Technology", published by IBM, 1980. As suggested in Thompson et al, capacitive sensing can be employed for a track following system. Whether employing capacitive sensing in the video disk technology or in the magnetic read/write system technology, the size of an inductor, a printed circuit transmission line or a resonant cavity is a severe disadvantage.

It is therefore one object of the invention to provide, in a capacitive sensor, implementation of an inductive element in a form of extremely small size. While the advantage in the video disk technology, from the mere reduction in size of the inductive element, should be apparent, other substantial advantages accrue in the magnetic read/write system. The thin film head referred to above is implemented as a lithographically produced pattern on a substrate. It is another object of the present invention to provide, in a capacitive sensor, an inductive element in the form of a lithographically produced conductive pattern so that, both the thin film head and the inductive element for the capacitive sensor, can be lithographically produced on a common substrate using common techniques allowing the head and associated circuitry to be monolithic.

Other and substantial advantages which accrue from the use of the present invention will be apparent to those skilled in the art after reviewing this description.

SUMMARY OF THE INVENTION

The invention thus provides a capacitive sensor which includes a sense electrode positioned for sensing capacitive variations. Coupled to the sense electrode is a circuit means for producing an output signal modulated in accordance with capacitive variations, the circuit means includes at least one passive element presenting inductive reactance which is produced using thin film techniques.

The capacitive variation sensor includes, in addition to the sense electrode and the element providing inductive reactance, an input element for coupling an oscillator to the capacitive sensor, as well as an output element for coupling the amplitude modulated output signal. Both elements include additional inductors implemented using thin film techniques.

In accordance with another aspect of the invention, exemplified in a magnetic read/write system including a magnetic slider assembly supporting a magnetic read/write head, a capacitive variation sensor is mounted on the magnetic slider assembly and includes at least one element presenting an inductive reactance, this at least one element is implemented with thin film techniques. The capacitive variation sensor includes a sense electrode which is formed on a substrate which also supports the thin film conductive pattern providing inductive reactance. In a magnetic read/write system, the magnetic slider assembly includes, in addition to the element providing inductive reactance, additional elements providing additional inductive reactance for coupling an oscillator to the capacitive variation sensor and the coupling amplitude modulated output signal to other circuitry. Both these elements are additional thin film conductive patterns supported on a common substrate.

In accordance with still another aspect of the invention, exemplified in a magnetic read/write system including a magnetic slider assembly supporting a thin film magnetic read/write head, a capacitive variation sensor may be mounted on the magnetic slider assembly and includes at least one element presenting an inductive reactance, this at least one element is implemented with thin film techniques. In accordance with this still another aspect of the invention, the pole tips of the thin film magnetic read/write head is employed as the capacitive variation sense electrode. This is implemented by providing a thin film conductive pattern from the pole tip of the magnetic read/write head to a bonding pad also supported on the substrate. Thus, it should be apparent to those skilled in the art that in this still another aspect of the invention the necessity for a dedicated sense electrode has been eliminated by employing the pole tip of the thin film magnetic read/write head as the sense electrode itself.

BRIEF DESCRIPTION OF THE DRAWINGS

The present invention will now be further described in the following portions of this specification when taken in conjunction with the attached drawings in which like reference characters identify identical apparatus and in which.

DETAILED DESCRIPTION OF PREFERRED EMBODIMENTS

Figures 1A, 1B:
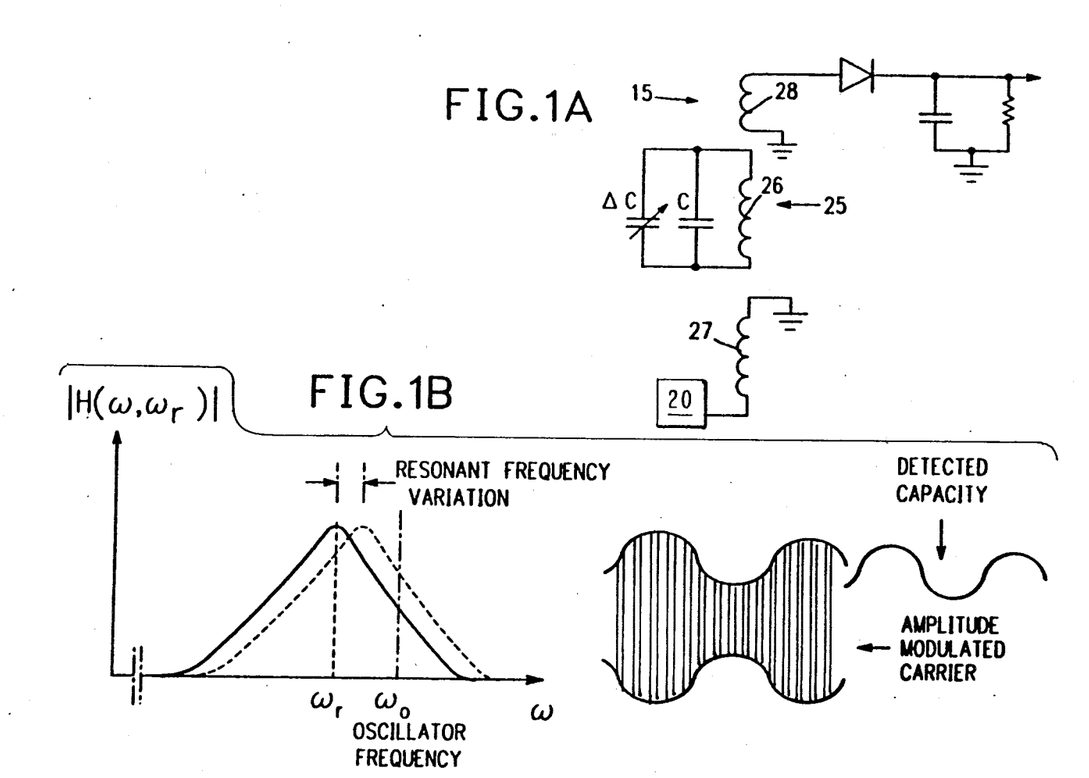
FIG. 1A is an example of a circuit comprising a capacitive variation sensor patterned from *RCA Review*, Vol. 39, page 38 (1978)
FIG. 1B shows typical frequency characteristics and waveforms.

FIGS. 1A and 1B illustrate respectively a lumped equivalent circuit of a suitable capacitive variation sensor 15, and some of the waveforms and frequency characteristics thereof. More particularly, and referring to FIG. 1A, a circuit 25 includes a sense electrode senses a variable capacitance (representing the information which was to be sensed) represented as $\Delta C$. Associated stray capacitance is illustrated at C and an inductor 26 is coupled in parallel. The inductor 26 is in turn coupled to an oscillator 20 via a further inductor 27. An output element includes a further inductor 28 coupled to a peak detector. FIG. 1B illustrates the response of the circuit as a function of frequency. More particularly, $\omega_0$ is the resonant frequency of the oscillator 20. $\omega_r$ is the resonant frequency of the circuit 25 in the absence of any capacitive variations $\Delta C$. In the presence of capacitive variations, e.g. when $\Delta C$ is non-zero, the resonant frequency of the circuit 25 changes, see the dotted curve in FIG. 1B. This gives rise to an amplitude modulated carrier, induced into inductor 28 and the output of the peak detector is illustrated in FIG. 1B. Thus, capacitive variations have been transformed into amplitude modulations. For foregoing is a lumped element equivalent circuit for the RCA video disk strip-line, see the aforementioned U.S. Pat. Nos. 3,783,196; 4,080,625 and 4,152,641 as well as the cited *RCA Review* article.

Figure 2A:
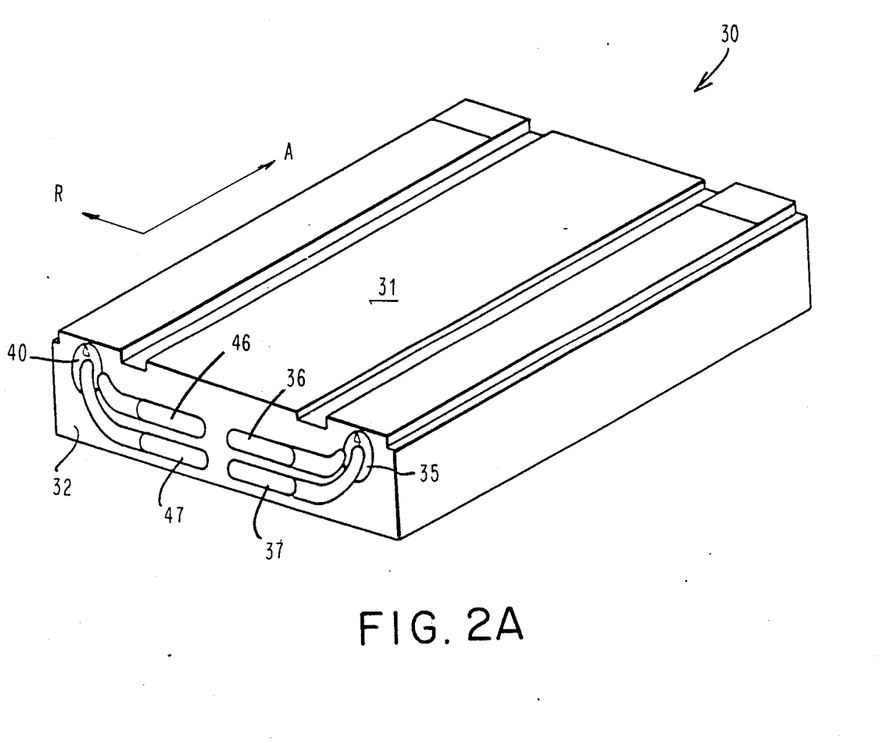
FIG. 2A illustrates a typical double rail slider including a thin film head.
Figure 2B:
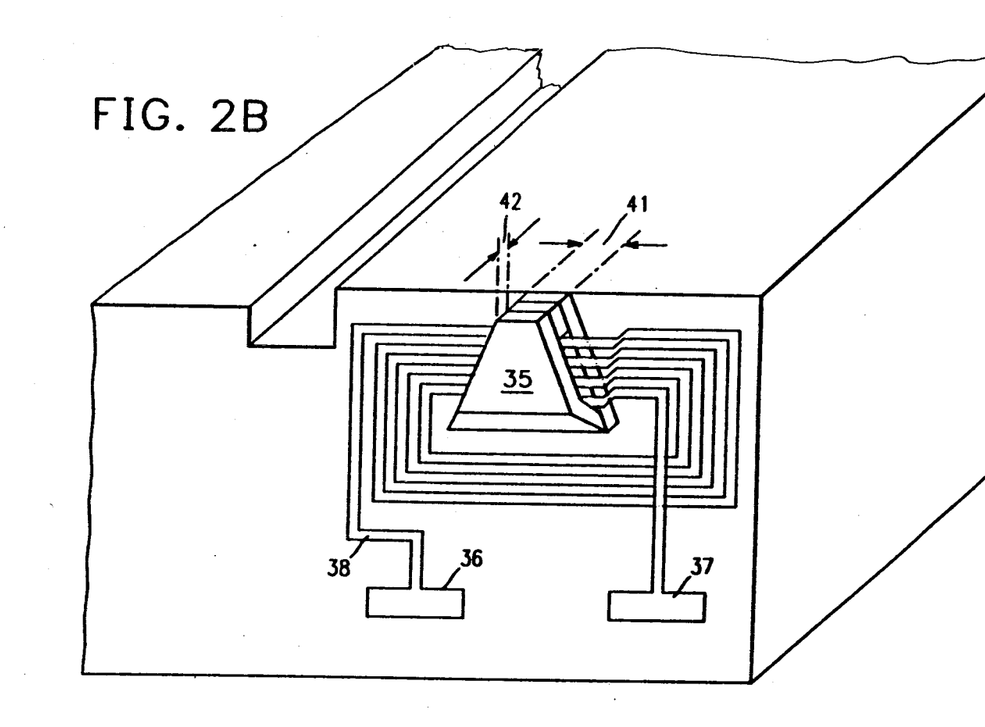
FIG. 2B is a detail of the thin film head.

FIGS. 2A and 2B illustrate a typical slider assembly used in a magnetic read/write system. More particularly, the overall view of the slider is shown at 30; in this illustration the slider is shown in inverted form, e.g. the face 31 of the slider 30, in use, is opposite the magnetic recording surface. The slider 30 moves relative to the recording surface in the direction A, and for track changing purposes, can move perpendicularly thereto in the direction R. The trailing surface of the slider 30, that is surface 32B, carries at least one magnetic read/write head 35 produced with thin film techniques. The head consists of a core and a coil, the coil is actually implemented as a lithographically produced conductive pattern using thin film techniques. The ends of the coil terminate in bonding pads 36 and 37 for connection to external circuitry. The slider 30 shown in FIG. 2 includes an additional head 40 and its own bonding pads 46, 47. Strictly defined, a thin film element has a thickness on the order of several hundred to several thousand Angstroms, and is applied by vacuum deposition to a substrate. For purposes of this application, however the various layers in a thin film element may have a thickness of up to about 5 microns, and other methods of deposition, such as electroplating, are included.

FIG. 2B illustrates one head 35 and its associated thin film coil 38 in more detail. The width of the head 35 defines the width of the data track 41. The head gap is shown at 42.

Figure 3A:
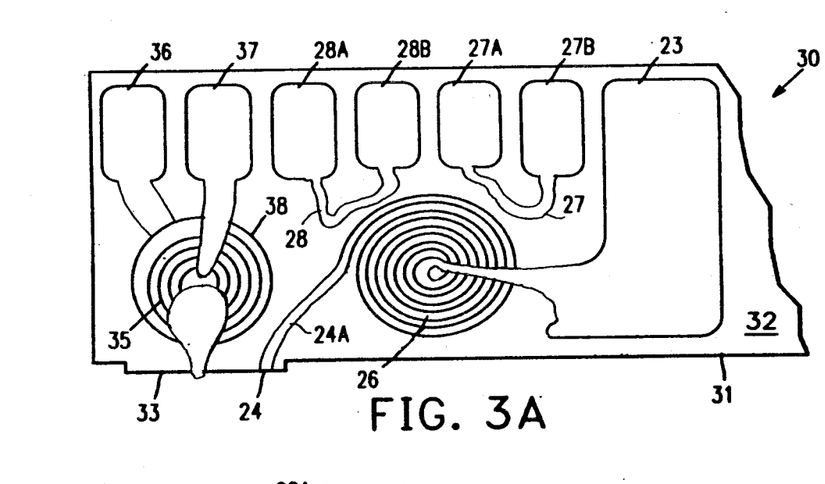
FIG. 3A illustrates a plan view of an appropriate substrate and a lithographically produced pattern thereon in accordance with the invention.

In accordance with one aspect of the invention, a thin film implemented capacitive variation sensor is also formed on the surface 32A of the slider 30. FIG. 3A is a detail of the elements of the capacitive variation sensor and their relationship with the thin film head 35.

Figure 3B:
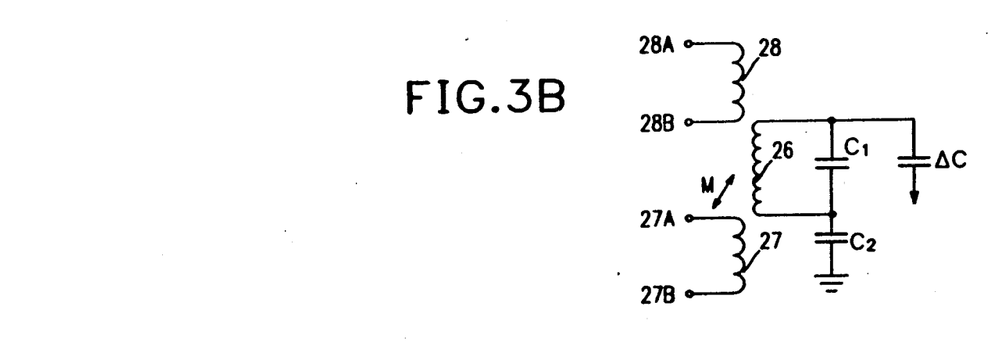
FIG. 3B is a lumped element equivalent circuit.

FIG. 3A is a plan view of the surface 32A of the slider 30. As shown in FIG. 3A, the thin film head 35 includes a lithographically produced conductive pattern 38 forming a coil, coupled to lands 36, 37 for connection to external circuitry. In this respect, the thin film head and associated elements can take the same form as in the prior art. The surface 33 forms the air bearing surface of the slider. Supported on the surface 32A is a capacitive variation sensor comprising an electrode 24 conductively coupled via a conductive pattern 24A to an element 26 providing inductive reactance. As seen in FIG. 3A, element 26 is in the form of a spiral coil, one terminal of the coil is coupled to the electrode 24, the other terminal of the coil is connected to a signal ground land 23. Inductively coupled to the coil 26 is a conductive pattern 27 coupled to lands 27A and 27B. A further conductive pattern 28 is inductively coupled to the element 26 terminating in additional lands 28A and 28B. A lumped equivalent circuit for the capacitive variation sensor is shown in FIG. 3B. Capacitive variations ΔC are coupled in parallel to a lumped equivalent capacitance across the coil, due to inter-winding capacitance and stray capacitance to ground, represented as $C_1$, and a further lumped equivalent element $C_2$ representing capacitance between ground land 23 and earth ground, including the capacitance to the substrate 32. The element 26 is coupled in parallel with these lumped equivalent capacitances. An element 27 is in mutual inductively coupled relation to the element 26 terminating in lands 27A and 27B. A further element 28 is inductively coupling relation to the element 26, itself terminating in lands 28A and 28B. Referring briefly to FIG. 1A, it will be apparent that an oscillator can be coupled to the lands 27A and 27B and an amplitude detecting circuit can be coupled to the lands 28A and 28B. Thus, the lithographic patterns of FIG. 3A can be employed to implement the equivalent circuit shown in FIGS. 1A or 3B. Of significant advantage, in accordance with the invention, is that the various inductive elements 26, 27, 28 can be formed on the same substrate 32 as the already present head 35 and associated coil 38. The elements 26-28 can be formed using the same thin film techniques with which head 35 is produced and thus head 35 and elements 26-28 can be monolithic. The pattern 26 is selected so that it presents substantial inductive reactance at the frequencies of interest, i.e. sufficient to provide reasonably measurable amplitude changes for capacitive variations of interest. Examples of substantial inductive reactance are provided below for several different embodiments.

Those skilled in the art will realize that because the different conductive portions in the coil 38 and the coil 26 cross other conductors, different conductive layers are necessary, separated by insulators (which are not illustrated).

The slider shown in FIG. 3A can be a conducting slider wherein the surface 32A is covered with an insulator. Alternatively, an insulating slider could be used as well. The lands provide ready connections for the circuitry shown in FIG. 3A to connection to a nearby electronics module at the base of the suspension, to a silicon integrated circuit bonded to the slider or for use on a silicon slider with integral circuitry.

Practical considerations indicate that the inductive parameters of interest are the inductance, the DC resistance, eddy current losses and parasitic capacitance. Existing thin film heads without leads are approximately 50 nH with 5 ohms DC resistance, that is, $\omega L = R$ at 16 MHz (with leads 10 MHz). For a constant diameter spiral coil (a coil whose diameter is independent of the number of turns), with constant thickness and resistivity, the L/R ratio is, to the first order, independent of the number of turns. If conductor resistance were the dominant loss mechanism, the coil would have a very satisfactory Q of 60 at 1 GHz. However, eddy current losses in the permalloy suggest that either an air "core" coil or a laminated permalloy would be necessary at 100 MHz to 1 GHz.

A quick estimate of the inductance of an air core coil the same size as the present thin film heads (without permalloy) suggests an inductance of about 10 nH. A larger diameter might provide 25 nH while increased copper thickness to 3 microns (rather than the present 2 microns) would provide a Q of 20 at 1 GHz without laminated permalloy. The parasitic capacitance between the coil and the conductive substrate would need to be augmented slightly to tune the resonance to 1 GHz.

By using the same thin film techniques to produce the inductive elements 26-28, as was used to produce the head 35, the entire capacitance variation sensor can be made monolithic, e.g. supported on a single substrate and actually formed simultaneously. Further advantages accrue because of the extremely small size of the inductive elements. Whereas the prior art capacitive variation sensors employing printed circuit inductive elements measured the length of these elements in inches, practical inductive reactances can be provided using the teachings of the present invention with spirals whose diameters would be measured in millimeters as opposed to inches. In a preferred embodiment, the coil diameter might be 0.5 mm. Those skilled in the art will readily appreciate the advantage of using an element having a dimension of 0.5 mm as compared to an element whose largest dimension was measured in inches.

Figure 4A:
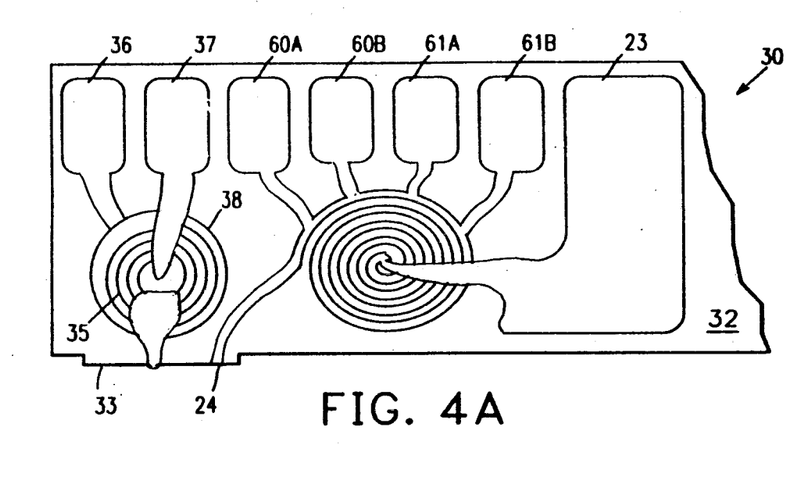
FIG. 4A is a plan view of a capacitively coupled version of the invention.
Figure 4B:
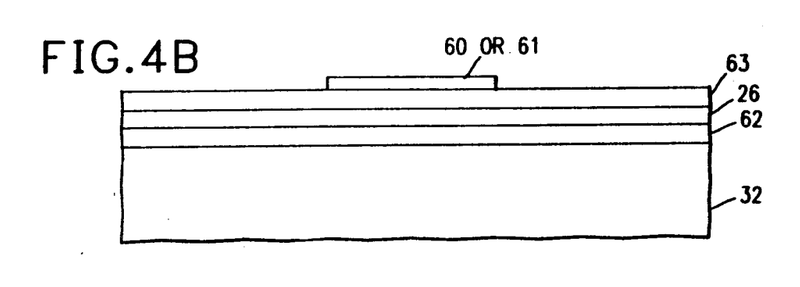
FIG. 4B is a typical cross-section showing capacitive coupling.

Whereas FIGS. 3A and 3B indicate that the oscillator and detector 20 are coupled inductively, it should also be apparent that capacitive coupling could be used in lieu of the inductive coupling. FIGS. 4A and 4B show a capacitive variation sensor similar to that shown in FIG. 3A, except that in the case of the sensor shown in FIGS. 4A and 4B, the various circuit components are capacitively coupled to the inductive element or coil 26. More particular, the input bonding pads 60A and 60B are capacitively coupled to the coil 26 and similarly the output conductive pads 61A and 61B are also capacitively coupled to the coil 26. FIG. 4B is a cross-section of a typical portion of FIG. 4A to illustrate the capacitive coupling to the coil 26. More particularly, as shown in FIG. 4B, atop the substrate 32 is placed an optional dielectric or spacer layer 62. This dielectric layer is important if the substrate is conductive, and correspondingly can be omitted if the substrate is an insulator. Atop the dielectric layer 62 is one electrode for the capacitive coupling and actually comprises a portion of the conductive pattern of the coil 26. A further dielectric layer 63 is located atop the coil 26, and another electrode 60 or 61 (A or B) is shown atop the dielectric layer 63. Current flowing in the coil 26 is capacitively coupled to the input or output bonding pads 60A, 60B, 61A or 61B. While FIGS. 4A and 4B show that the input and output are both capacitively coupled, and FIG. 3A shows the input and output inductively coupled, those skilled in the art will be aware that capacitive and inductive coupling can be used simultaneously, e.g. inductive coupling could be used for input or output, and capacitive coupling could be used for output or input, respectively. A combination of capacitive input and inductive output, or conductive input and capacitive output, has the advantage of reducing parasitic coupling between input and output. Additionally, as was the case with FIG. 3A, the various elements shown in FIG. 4A can be implemented using thin film techniques so that the entire capacitive variation sensor can be monolithic, e.g. formed simultaneously and supported on the substrate 32.

The invention provides the designer with additional design freedom in the ability to implement variable inductive reactance. For example, the resonant frequency of a parallel LC circuit (such as the circuit made up of the coil 26, the capacitors $C_1$, $C_2$ and the sense capacitance ΔC) can be servo corrected for part-to-part variations and for slowly varying parasitic capacitances by electronically varying the inductive reactance. This is implemented by varying the permeability of a flux carrying permalloy layer by means for a DC current in the same or an adjacent winding. In other words, a controllable DC supply is used to feed current to either the coil 26 or an adjacent, inductively coupled coil.

Figure 5:
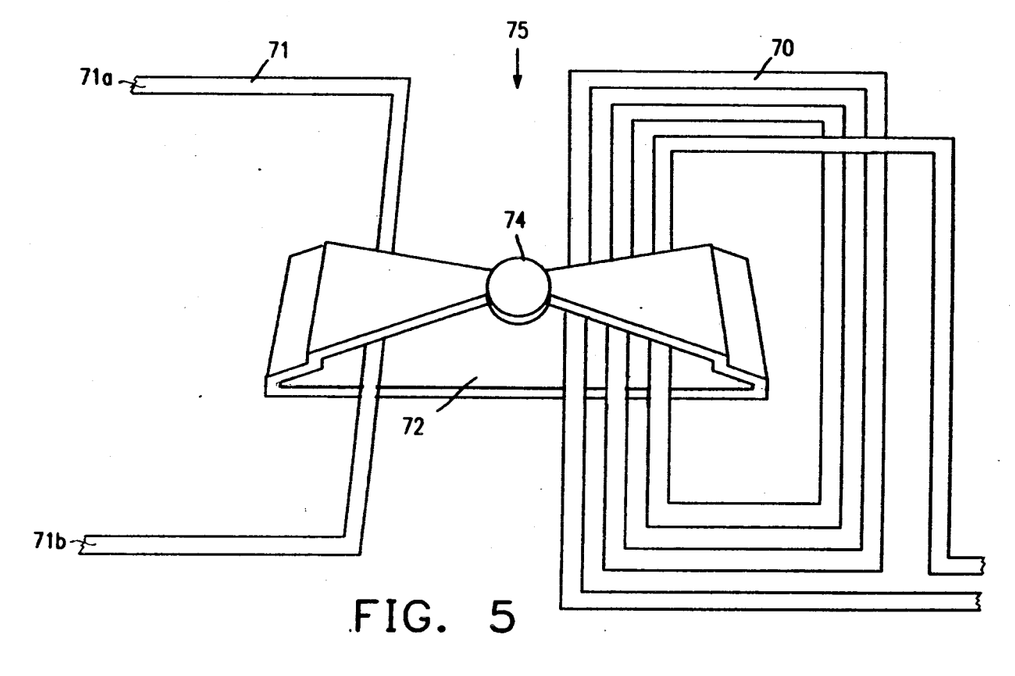
FIG. 5 illustrates providing variable inductance in a thin film element.

In particular, FIG. 5 shows an electronically variable inductor 75 which may be used in place of the inductor 26. In FIG. 5, the inductive and/or capacitive coupling to the input/output pads are not illustrated, although those skilled in the art will understand how those elements can be coupled to the inductor 75. The inductor 75 includes a main spiral 70 as well as a control loop 71 and a magnetic permeable core 72 and 73. The core 72 is deposited first, followed by an insulating layer (not illustrated) and then by the conductive pattern used to form the coil spiral 70 and control loop 71. After an additional insulating layer (also not illustrated), the final magnetically permeable layer 73 is deposited and patterned. In operation, spiral coil 70 is part of the resonant circuit, as described above. Its inductance is increased from an air core inductor, by the presence of the flux linkage provided by cores 72 and 73. However, current through a single turn control loop 71 saturates the magnetically permeable material in the narrowed region 74, thus reducing the permeance provided by the core 73 and thus reducing the inductance of the spiral coil 70. In this manner, the resonant circuit 26 can be tuned to a desired frequency without attachment of a variable capacitance chip to the slider.

Those skilled in the art recognize that use of the narrowed region 74 is not necessary for current control of the inductance 75. Increasing current in loop 71 will eventually, at some current level, produce saturation in the magnetic layers 72 and 73, beginning with the region of maximum flux density. The layers 72 and 73 are preferably formed from the same magnetic layer used to form the magnetic reading head 35 including permalloy and laminated permalloy.

Figure 6:
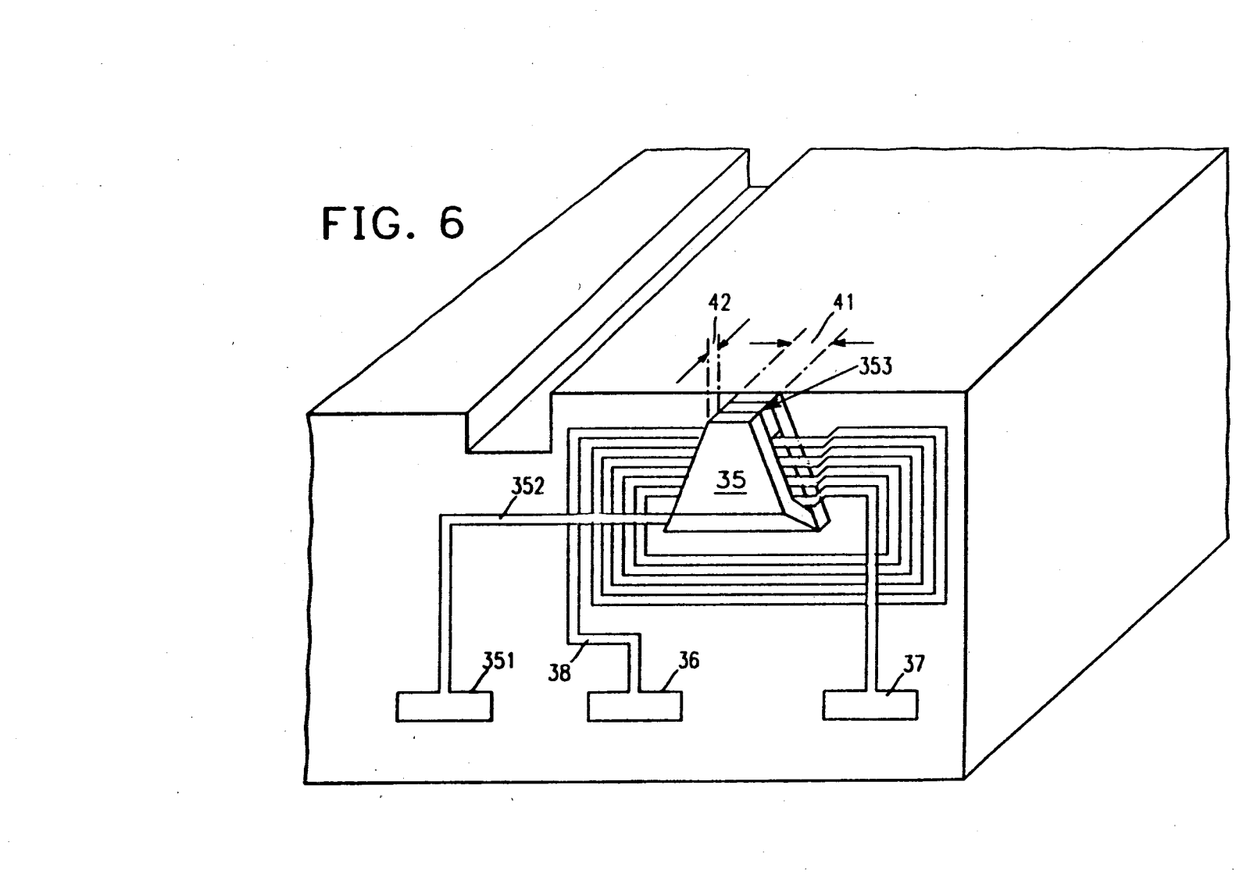
FIG. 6 is a detail of the thin film head showing use of the pole tips of the head as the capacitive sense electrode, this is illustrated by showing a thin film conductive pattern linking the pole tip of the thin film head to a bonding pad.

FIGS. 3A and 4A show capacitive variation sensors which employ a discrete sense electrode 24. However, that is not essential to the invention. Rather, the thin film magnetic read/write head 35 can be used as the sense electrode; more particularly, the pole tips, or a pole tip, can be used in lieu of the sense electrode 24. FIG. 6 is an illustration of the magnetic read/write head similar to that shown in FIG. 2A, however, FIG. 6 shows, in addition to the illustration of FIG. 2A, an additional bonding pad 351 and the thin film conductive pattern 352 coupled between the bonding pad 351 and the magnetic read/write head 35. More particularly, the pattern 352 is conductively coupled to the pole tips (or a single pole tip) 353 of the head 35. In the embodiment shown in FIG. 6, the magnetic head 35 is coupled to other circuitry (not illustrated) for driving the head, via the pads 36, 37, and for sensing capacitive variations, via the pad 351.

FIG. 6 illustrates a first conductive pattern forming a coil for the head, and coupled between pads 36, 37 and a second conductive pattern 352, for coupling the pad 351 to the pole tips 353. FIG. 6 shows these two different patterns as crossing each other. Of course an insulating layer is required to maintain the integrity of these two different patterns, and that insulating layer is not shown in FIG. 6, but its presence will be appreciated by those skilled in the art.

Figure 7:
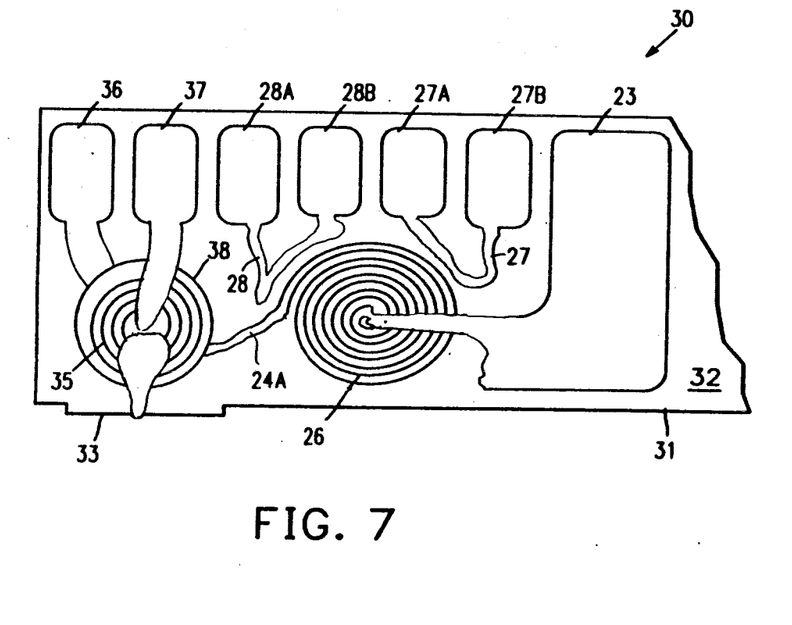
FIG. 7 is an illustration of the substrate similar to FIG. 3A except that the sense electrode 24 has been eliminated, and instead the conductive pattern 24A is conductively coupled to the head 35.

An alternate embodiment, similar to FIG. 3A is shown in FIG. 7. FIG. 7 is identical to FIG. 3A except that the capacitive sense electrode has been eliminated. Rather, the conductive pattern 24A (which previously was coupled to the sense electrode 24) is now coupled to the pole tips of the head 35 via patterned conductor segment 24B. This conductive coupling can be identical to that shown in FIG. 6.

Thus, in accordance with either FIG. 6 or FIG. 7, the pole tips of the magnetic read/write head 35 can be used in lieu of the sense electrode 24 for detecting capacitive variations. The circuitry for performing this function can be separately supported (as is suggested in FIG. 6) or it can be monolithic with the head, as shown in FIG. 7.

An additional advantage to the invention, in addition to providing an essentially lithographically produced capacitance variation sensor is the reduced sensitivity of the capacitive sensor to lead capacitance. If the sense electrode 24 were directly connected to the bonding pad for eventual connection to an electronic circuit, whether strip line or cavity, then the parasitic capacitance of the bonding pad, as well as any additional capacitance of the bonding wire or lead (which itself may be time varying due to mechanical vibration) will act to reduce the sensitivity of the capacitive sensor and modulate the signal. In contrast, in FIG. 3A, this effect is reduced by approximately the Q of the tune circuit, the L/C circuit acts to impedance match the tiny signal capacitance to the external circuitry which in this case is a AM detector.

What is claimed is:

1. In a magnetic read/write system including a magnetic slider assembly supporting a magnetic read/write head, capacitive variation sensor means mounted on said magnetic slider assembly for sensing capacitive variations, including at least one element presenting substantial inductive reactance, said at least one element comprising a thin film conductive pattern.

2. The magnetic slider assembly of claim 1 in which said capacitive variation sensor means includes a sense electrode coupled to said at least one element.

3. The magnetic slider assembly of claim 2 in which said sense electrode and said at least one element are formed on a common substrate.

4. The magnetic slider assembly of claim 1 or 2 which further includes a substrate supporting both said at least one element and said magnetic read/write head.

5. The magnetic slider assembly of claim 1 in which said capacitive variation sensor means includes plural elements, each presenting inductive reactance, each of said elements is a thin film conductive pattern and a sense electrode conductively coupled to at least one of said elements.

6. The magnetic slider assembly of claim 5 in which all said elements and said sense electrode are supported on a common substrate.

7. The magnetic slider assembly of claim 6 in which said magnetic read/write head comprises a thin film conductive pattern which is supported by said common substrate.

8. The magnetic slider assembly of claim 1 or 7 in which the inductive reactance of said at least one element is variable, and wherein said capacitive variation sensor means further includes a control loop inductively coupled to said at least one element for controlling the inductive reactance thereof, said control loop comprising a thin film conductive pattern.

9. The magnetic slider assembly of claim 1 wherein said capacitive variation sensor means includes a sense electrode comprising a pole tip of said magnetic read/write head.

10. A magnetic read/write system including a slider assembly supporting a thin film magnetic read/write head, capacitive variation sensor means mounted on said slider assembly for sensing capacitive variations, said sensor means comprising a thin film conductive pattern presenting substantial inductive reactance.

11. The system of claim 10 in which said thin film magnetic read/write head comprises spaced thin film conductive patterns comprising pole tips, and magnetically coupled thereto a coil, in which said capacitive variation sensor means comprises at least one of said magnetic pole tips, and which further includes means for conductively connecting to said pole tips.

* * * * *